United States Patent
Park et al.

(10) Patent No.: US 8,459,141 B2
(45) Date of Patent: Jun. 11, 2013

(54) STEERING COLUMN FOR VEHICLE

(75) Inventors: Jung Sik Park, Wonju-si (KR); Kyung Tae Kwon, Wonju-si (KR)

(73) Assignee: Mando Corporation, Pyeongtaek-Si (KR)

( * ) Notice: Subject to any disclaimer, the term of this patent is extended or adjusted under 35 U.S.C. 154(b) by 268 days.

(21) Appl. No.: 12/876,445

(22) Filed: Sep. 7, 2010

(65) Prior Publication Data

US 2011/0056324 A1 Mar. 10, 2011

(30) Foreign Application Priority Data

Sep. 7, 2009 (KR) .................. 10-2009-0083892
Aug. 23, 2010 (KR) .................. 10-2010-0081541

(51) Int. Cl.
*B62D 1/184* (2006.01)

(52) U.S. Cl.
USPC .................................. 74/493; 280/775

(58) Field of Classification Search
USPC ..................... 74/492–495; 280/775, 777
See application file for complete search history.

(56) References Cited

U.S. PATENT DOCUMENTS

| | | | | |
|---|---|---|---|---|
| 5,605,351 A * | 2/1997 | Higashino | ..................... | 280/775 |
| 5,655,413 A * | 8/1997 | Barton | ............................. | 74/493 |
| 5,657,668 A * | 8/1997 | Hibino et al. | ................... | 74/493 |
| 5,722,299 A * | 3/1998 | Yamamoto et al. | ............. | 74/493 |
| 5,730,465 A * | 3/1998 | Barton et al. | ................. | 280/775 |
| 5,788,277 A * | 8/1998 | Hibino et al. | ................. | 280/775 |
| 5,979,265 A * | 11/1999 | Kim et al. | ........................ | 74/493 |
| 6,761,376 B2 * | 7/2004 | Riefe et al. | ..................... | 280/777 |
| 7,134,692 B2 * | 11/2006 | Yamamura | ..................... | 280/777 |
| 7,219,926 B2 * | 5/2007 | Ikeda et al. | .................... | 280/775 |
| 7,228,754 B2 * | 6/2007 | Matsumiya | ..................... | 74/493 |
| 7,252,019 B2 * | 8/2007 | Lee | ..................... | 74/493 |
| 7,393,014 B2 * | 7/2008 | Bechtel et al. | ................ | 280/777 |
| 7,401,813 B2 * | 7/2008 | Sawada et al. | ................ | 280/775 |
| 7,506,893 B2 * | 3/2009 | Higashino et al. | ............ | 280/776 |
| 7,516,985 B2 * | 4/2009 | Cymbal et al. | ................ | 280/775 |
| 7,726,691 B2 * | 6/2010 | Yamada | ........................ | 280/775 |
| 7,770,488 B2 * | 8/2010 | Kim et al. | ........................ | 74/493 |
| 7,882,761 B2 * | 2/2011 | Cymbal et al. | ................. | 74/493 |
| 8,011,268 B2 * | 9/2011 | Okada et al. | ..................... | 74/493 |
| 8,042,426 B2 * | 10/2011 | Jo | ..................... | 74/493 |
| 8,127,639 B2 * | 3/2012 | Manwaring et al. | ............ | 74/492 |
| 2002/0026848 A1 * | 3/2002 | Kurita | ............................ | 74/493 |
| 2002/0178857 A1 * | 12/2002 | Matsumiya | ..................... | 74/493 |
| 2004/0113408 A1 * | 6/2004 | Yamamoto et al. | ........... | 280/775 |
| 2005/0006891 A1 * | 1/2005 | Okamoto et al. | ............. | 280/777 |
| 2005/0104353 A1 * | 5/2005 | Ikeda et al. | .................... | 280/775 |
| 2005/0217407 A1 * | 10/2005 | Yamamura | ..................... | 74/492 |
| 2006/0021460 A1 * | 2/2006 | Schulz | ............................. | 74/493 |
| 2006/0097501 A1 * | 5/2006 | Yoshimoto et al. | ............ | 280/777 |
| 2006/0125224 A1 * | 6/2006 | Higashino et al. | ............. | 280/777 |

(Continued)

*Primary Examiner* — Troy Chambers
*Assistant Examiner* — Rachel Gude
(74) *Attorney, Agent, or Firm* — McDermott Will & Emery LLP

(57) ABSTRACT

Disclosed is a steering column having an outer tube, an adjustment lever, a tilt bolt and a steering shaft. According to the present invention, force for supporting the outer tube is increased and strengthened at the time of tightening the adjustment lever, and the tilt bolt is coupled on the central axis of the steering shaft so that no bending is caused and the adjustment lever does not hit a driver on the knee when a vehicle collision occurs, whereby the collision safety of the vehicle can be improved, and the number of parts and steps for assembling the parts can be reduced.

12 Claims, 7 Drawing Sheets

U.S. PATENT DOCUMENTS

| | | | |
|---|---|---|---|
| 2006/0131864 A1* | 6/2006 | Riefe et al. | 280/775 |
| 2006/0151984 A1* | 7/2006 | Higashino et al. | 280/775 |
| 2006/0163861 A1* | 7/2006 | Higashino | 280/777 |
| 2006/0170204 A1* | 8/2006 | Higashino et al. | 280/775 |
| 2006/0207380 A1* | 9/2006 | Higashino | 74/493 |
| 2006/0214410 A1* | 9/2006 | Sawada et al. | 280/775 |
| 2007/0039403 A1* | 2/2007 | Manwaring et al. | 74/492 |
| 2007/0068311 A1* | 3/2007 | Shimoda et al. | 74/493 |
| 2007/0137377 A1* | 6/2007 | Kamei | 74/493 |
| 2007/0295143 A1* | 12/2007 | Oh | 74/493 |
| 2008/0178701 A1* | 7/2008 | Kim et al. | 74/493 |
| 2008/0178702 A1* | 7/2008 | Lutz | 74/493 |
| 2008/0252056 A1* | 10/2008 | Moriyama et al. | 280/775 |
| 2009/0120230 A1* | 5/2009 | Park | 74/493 |
| 2009/0145257 A1* | 6/2009 | Miyawaki et al. | 74/493 |
| 2009/0145258 A1* | 6/2009 | Davies et al. | 74/495 |
| 2009/0314121 A1* | 12/2009 | Park | 74/495 |
| 2010/0139439 A1* | 6/2010 | Uesaka | 74/493 |
| 2010/0300236 A1* | 12/2010 | Goulay et al. | 74/493 |
| 2010/0326230 A1* | 12/2010 | Oh | 74/493 |
| 2011/0056324 A1* | 3/2011 | Park et al. | 74/493 |

* cited by examiner

STEERING COLUMN FOR VEHICLE

BACKGROUND OF THE INVENTION

1. Field of the Invention

The present invention relates to a steering column for a vehicle. More particularly, the present invention relates to a steering column having an outer tube, an adjustment lever, a tilt bolt and a steering shaft, wherein force for supporting the outer tube is increased and strengthened at the time of tightening the adjustment lever, and the tilt bolt is coupled on the central axis of the steering shaft so that no bending is caused and the adjustment lever does not hit a driver on the knee when a vehicle collision occurs, whereby the collision safety of the vehicle can be improved, and the number of parts and steps for assembling the parts can be reduced.

2. Description of the Prior Art

As generally known in the art, a steering apparatus for a vehicle is a means for allowing a driver of the vehicle to change the running direction of the vehicle in accordance with the driver's intention, wherein the steering apparatus helps the driver to freely change the rotation center of the front wheels of the vehicle, so that the vehicle can be run at a direction desired by the driver.

In such a steering apparatus, the steering force produced when the driver manipulates the steering wheel is transferred to a rack and pinion mechanism through steering shaft, and finally changes the direction of the right and left front wheels.

In addition, for the convenience of the driver, such a steering apparatus may be additionally provided with a telescopic device or a tilt device, wherein the tilt device is a means for adjusting the anchoring angle of the steering wheel, and the telescopic device is formed by inserting one hollow tube in another hollow tube to be axially extended or retracted. The telescopic device also has a function for absorbing impact energy as the steering shaft and the steering column are collapsed at the time of a vehicle collision.

According to the above-mentioned functions, a steering apparatus is classified into a telescope-type steering apparatus or a tilt-type steering apparatus. Occasionally, a tilt function may be incorporated into a telescope-type steering apparatus. Through these functions, a driver can perform smooth steering manipulation by adjusting the extension or the inclined angle of the steering wheel to be suitable for his or her height or body shape.

FIG. 1 is an exploded perspective view showing a part of a conventional steering column for a vehicle.

As shown in FIG. 1, a conventional steering column includes: an outer tube 100 for housing a steering shaft 175; an inner tube 170 inserted in the outer tube 100; a lower bracket 165 for anchoring the inner tube to a vehicle body; an upper bracket 105 positioned on the upper side of the outer tube 100 and anchored to the vehicle body; a distance bracket 180 having an extended telescope opening 185, the distance bracket being anchored integrally to the outer tube 100; a tilt bracket 150 formed integrally with the upper bracket 105, the tilt bracket having an extended tilt opening 110; a fixed gear 145 formed on an outer surface of the tilt bracket 150; a movable gear 140 engaged with or disengaged from the fixed gear 145; a tilt bolt 130 extending through the tilt opening 110; a cam 135 coupled to the movable gear 140; a washer 125 and a nut 120 for anchoring the cam 135 and the adjustment lever 115; and a gear spring interposed between the movable gear 140 and the fixed gear 145.

Tilt or telescopic action is induced by tightening and releasing the adjustment lever 115. If the adjustment lever 115 is tightened, the tilt bracket 150 contracts, thereby applying compression force to the outer tube 100. As a result, the outer tube 100 comes into close contact with the inner tube 170 due to the compression force, and the tilt or telescopic action cannot be executed. To the contrary, if the adjustment lever 115 is released, the compression force applied to the outer tube 100 and the inner tube 170 disappears. As a result, the tilt or telescopic action can be executed.

The telescopic action is completed by releasing the adjustment lever 115, then changing the position of the tilt bolt 130 along the extended telescope opening 185 formed in the distance bracket 180, and then tightening the adjustment lever 115.

The tilt action is completed by releasing the adjustment lever 115, then changing the position of the tilt bolt 130 along the extended tilt opening 110, and then tightening the adjustment lever 115.

In a state in which the adjustment lever is locked, the outer tube 100 and the steering shaft 175 are fixed. However, if the adjustment lever 115 is released, the outer tube 100 and the inner tube 170 are allowed to be tilted with reference to the tilt hinge 160 by the cam 135, or the steering column is allowed to be extended or retracted in the axial direction.

Such a steering column for a vehicle has problems in that since the tilt bolt coupling position is spaced downwardly from the central axis of the steering shaft, substantial bending is caused at the time of a vehicle collision, and the distribution of tightening force is increased, and in that since the adjustment lever is coupled at a position lowered by the tilt bolt coupling position, the adjustment lever may hit a driver on the knee at the time of a vehicle collision, which causes a problem in view of safety.

SUMMARY OF THE INVENTION

Accordingly, the present invention has been made to solve the above-mentioned problems occurring in the prior art, and an object of the present invention is to provide a steering column for a vehicle, which has an outer tube, an adjustment lever, a tilt bolt and a steering shaft, wherein force for supporting the outer tube is increased and strengthened at the time of tightening the adjustment lever, and since the tilt bolt coupling position is positioned on the central axis of the steering shaft, no bending is caused and the adjustment lever does not hit a driver on the knee when a vehicle collision occurs, whereby the collision safety of the vehicle can be improved, and the number of parts and steps for assembling the parts can be reduced.

In order to accomplish this object, there is provided a steering column including for a vehicle, including: a hollow inner tube surrounding a steering shaft; a hollow outer tube fitted on the outer periphery of the inner tube to be slid at the time of telescopic action; a ring bolt having a pair of fastening parts, to which an adjustment lever and an anchoring means are coupled, respectively, and an annular through-hole part formed between the fastening parts integral to the fastening parts, the outer tube being introduced through the annular through-hole part; and a tilt bracket having an anchoring part coupled to a mounting bracket and a pair of clamping parts extending substantially vertically from the anchoring part to be opposed to each other, wherein the clamping parts are formed with seating recesses, respectively, and the through-hole part of the ring bolt is fitted in the seating recesses, wherein each of the seating recesses is formed with a tilt slot, the fastening parts of the ring bolt extending through the tilt slots and coupled to the adjustment lever, and wherein support parts for supporting the outer periphery of the outer tube are formed at the opposite lateral sides of each of the seating recesses.

According to the present invention, force for supporting the outer tube is increased and strengthened at the time of tightening the adjustment lever, and since the tilt bolt coupling position is positioned on the central axis of the steering shaft, no bending is caused and the adjustment lever does not hit a driver on the knee when a vehicle collision occurs, whereby the collision safety of the vehicle can be improved, and the number of parts and steps for assembling the parts can be reduced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
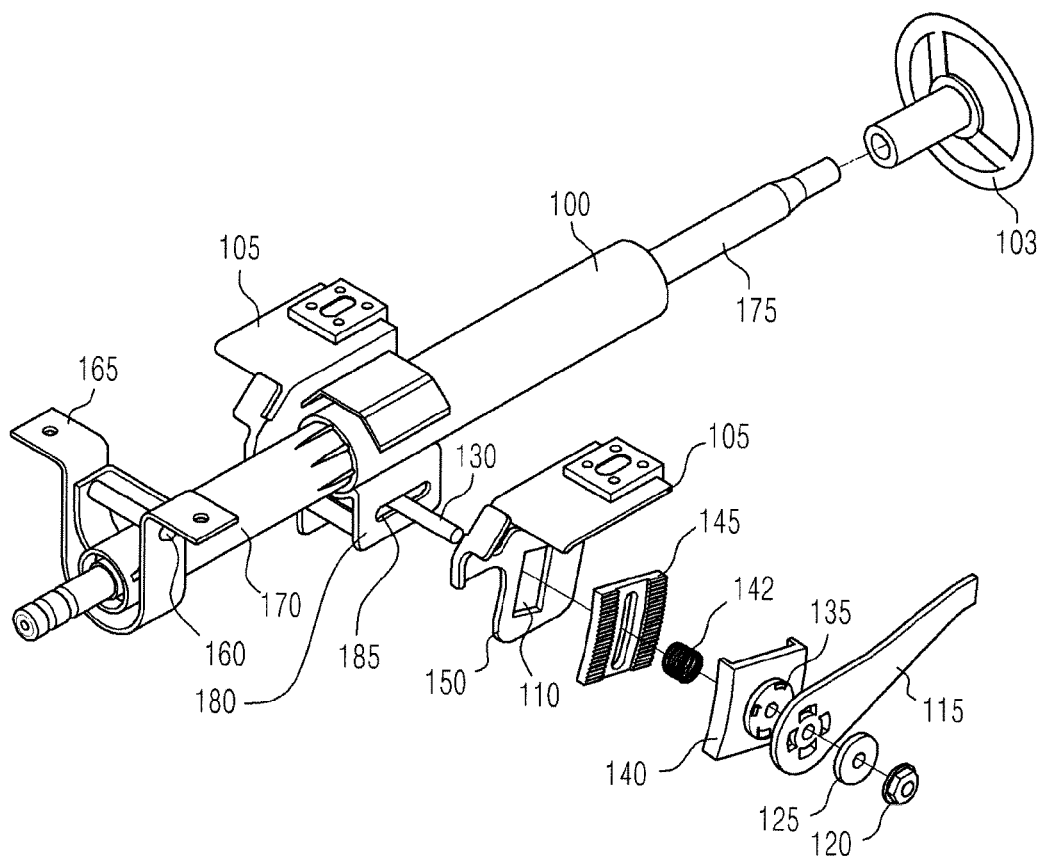
FIG. 1 is an exploded perspective view showing a part of a conventional steering column for a vehicle.

Hereinafter, exemplary preferred embodiments of the present invention will be described with reference to the accompanying drawings. In the following description and drawings, it shall be noted that the same reference numerals are used to designate the same or similar components, and so repetition of the description on the same or similar components will be omitted. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
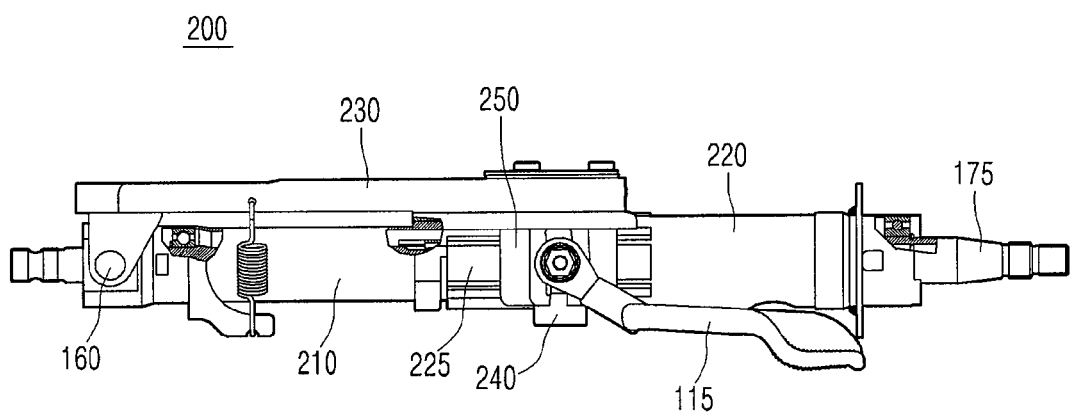
FIG. 2 is a side elevational view of a part of a steering column for a vehicle in accordance with an embodiment of the present invention.
Figure 3:
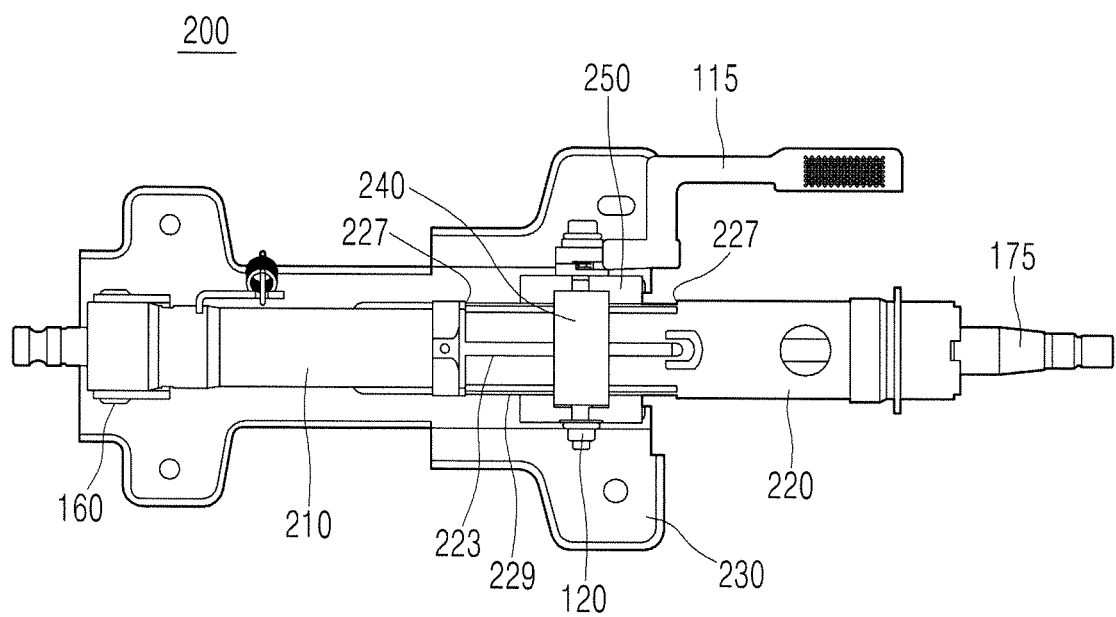
FIG. 3 is a top plan view of the part of the steering column of the embodiment of FIG. 2.
Figure 4:
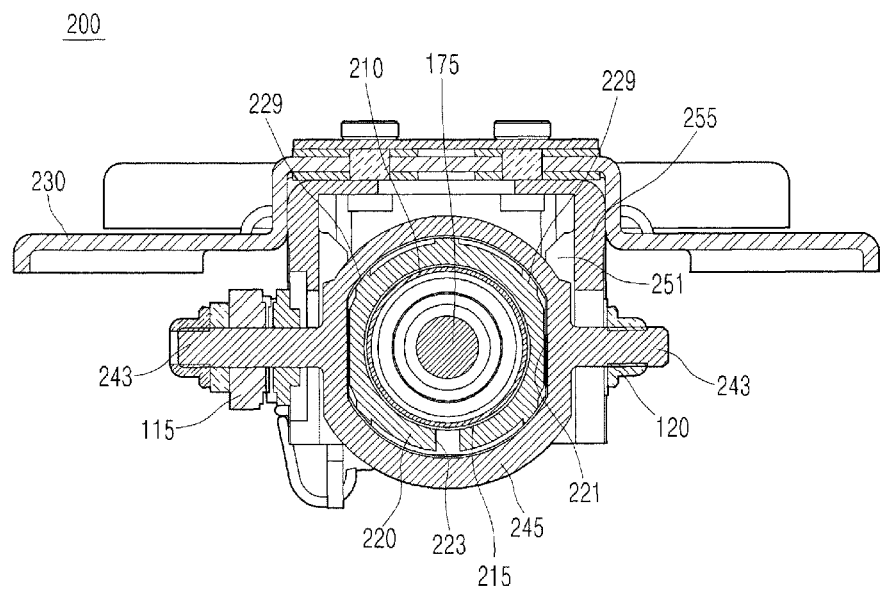
FIG. 4 is a cross-sectional view of a ring bolt joint part in the steering column of the embodiment of FIG. 2.
Figure 5:
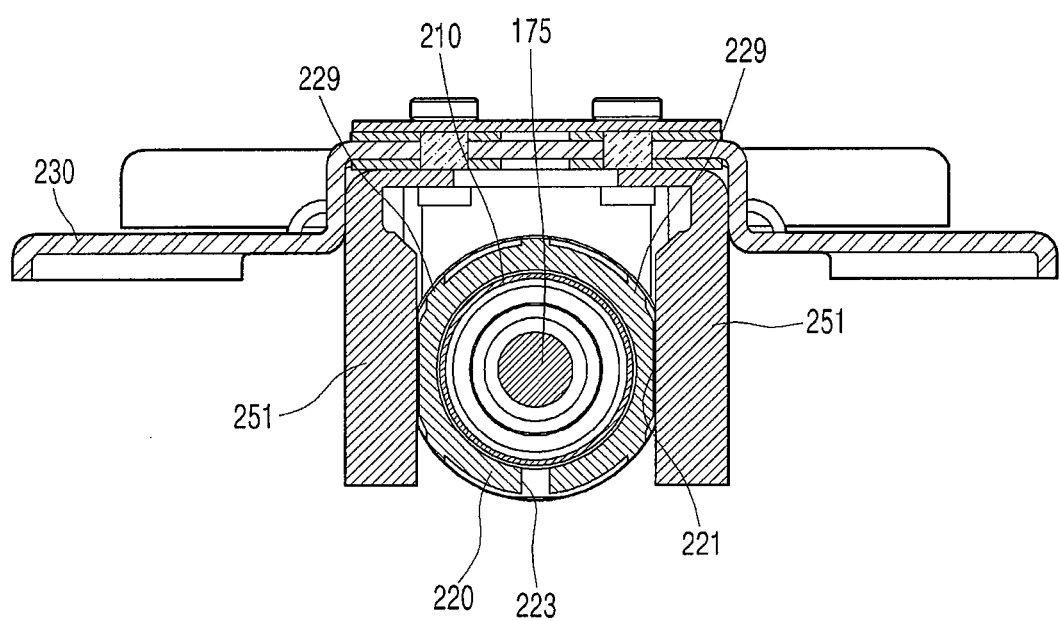
FIG. 5 is a cross-sectional view of a tilt bracket support part in the steering column of the embodiment of FIG. 2.
Figure 6:
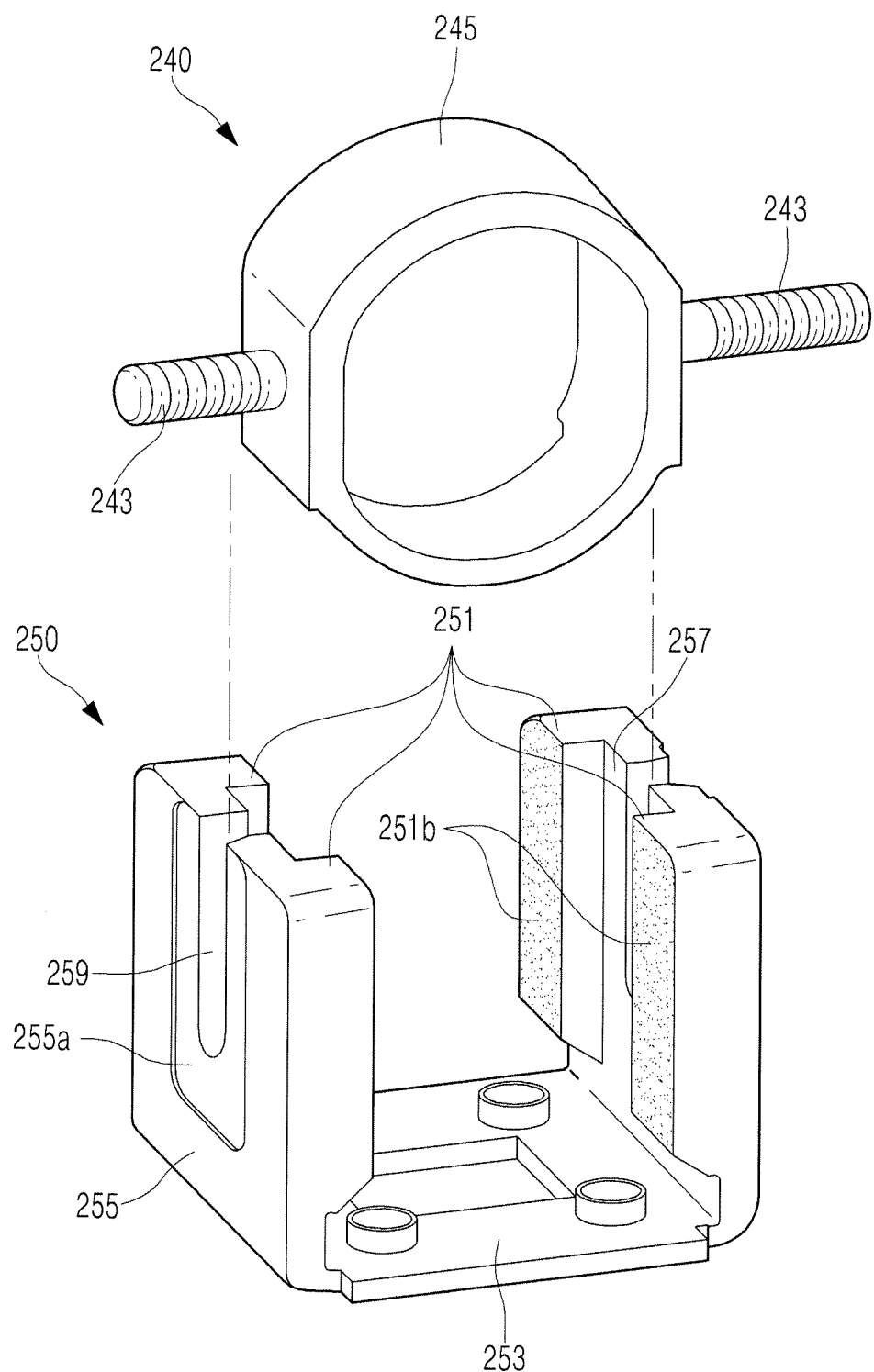
FIG. 6 is a perspective view showing a ring bolt and a tilt bracket in the steering column of FIG. 2.
Figure 7:
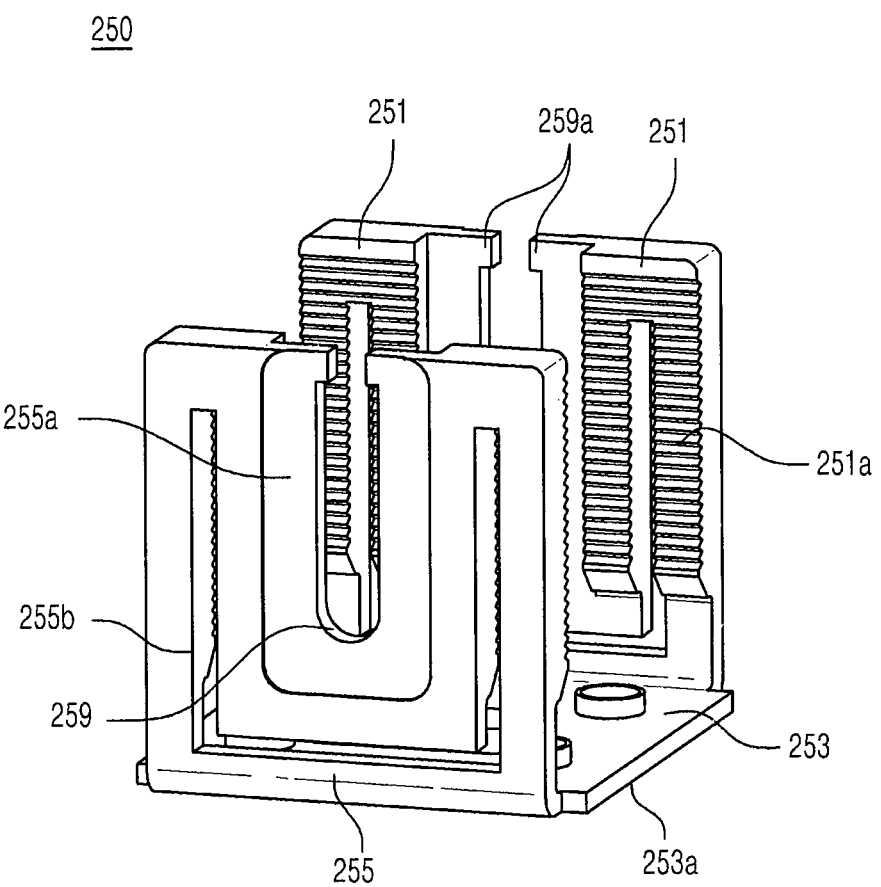
FIG. 7 is a perspective view showing another embodiment of the present invention.

FIG. 2 is a side elevational view of a part of a steering column for a vehicle in accordance with an embodiment of the present invention, and FIG. 3 is a top plan view of the part of the steering column of the embodiment of FIG. 2. In addition, FIG. 4 is a cross-sectional view of a ring bolt joint part in the steering column of the embodiment of FIG. 2, and FIG. 5 is a cross-sectional view of a tilt bracket support part in the steering column of the embodiment of FIG. 2. Moreover, FIG. 6 is a perspective view showing a ring bolt and a tilt bracket in the steering column of FIG. 2, and FIG. 7 is a perspective view showing another embodiment of the present invention.

As shown in the drawings, a steering column 200 for a vehicle in accordance with an embodiment of the present invention includes: a hollow inner tube 210 surrounding a steering shaft 175; a hollow outer tube 220 fitted on the outer periphery of the inner tube 210 to be slid at the time of telescopic action; a ring bolt 240 having a pair of fastening parts 243, to which an adjustment lever 115 and an anchoring means 120 are coupled, respectively, and an annular through-hole part 245 formed between the fastening parts 243 integral to the fastening parts 243, the outer tube 220 being introduced through the annular through-hole part 245; and a tilt bracket 250 having an anchoring part 253 coupled to a mounting bracket 230 and a pair of clamping parts 255 extending substantially vertically from the anchoring part 253 to be opposed to each other, wherein the clamping parts 255 are formed with seating recesses 257, respectively, and the through-hole part 245 of the ring bolt 240 is fitted in the seating recesses 257, wherein each of the seating recesses 257 is formed with a tilt slot 259, the fastening parts 243 of the ring bolt 240 extending through the tilt slots 259 and coupled to the adjustment lever 115, and wherein support parts 251 for supporting the outer periphery of the outer tube 220 are formed at the opposite lateral sides of each of the seating recesses 257.

The steering column 200 of the present embodiment is characterized in that the ring bolt 240, which serves as a conventional tilt bolt (indicated by reference numeral 130 in FIG. 1), is positioned on the central axis of the steering shaft 175, and when the adjustment lever 115 is tightened, the support parts 251 provided on the tilt bracket 250 apply compression force to the outer tube 220 to such an extent that the outer tube 220 comes into close contact with the inner tube 210.

The inner tube 210 has a hollow shape for surrounding the steering shaft 175, and is coupled, at the bottom side thereof, to the mounting bracket 230 through a tilt hinge 160. The hollow outer tube 220 is fitted on the outer periphery of the inner tube 210 at an end portion thereof in such a manner that at the time of telescopic action, the outer tube 220 is slid on the inner tube 210.

In addition, a telescope bush 215 for reducing acting friction at the time of telescopic action may be interposed between the outer periphery of the inner tube 210 and the inner periphery of the outer tube 220, so that the outer tube 220 can be slid on the outer periphery of the telescope bush at the time of telescopic action.

The ring bolt 240 is coupled to the outer tube 220, wherein when the adjustment lever 115 is tightened and released, the ring bolt 240 induces tilt or telescopic action by tightening or releasing the tilt bracket 250 so as to apply compression pressure to the outer tube 220 or release the compression pressure from the outer tube 220. Each of the lateral sides of the ring bolt 240 is provided with a fastening part 243, wherein the fastening part 243 is threaded so that it can be engaged with an adjustment lever 115 or an anchoring means 120. An annular through-hole part 245 is formed between the fastening parts 243 integrally with the fastening parts 243, and the outer tube 220 is inserted through the through-hole part 245.

That is, since the adjustment lever 115 and the anchoring means 120 are coupled to the fastening parts 243 of the opposite lateral sides of the ring bolt 240, if the adjustment lever 115 is tightened, the clamping parts 255 of the tilt bracket 250 to be described later are tightened against the outer tube 220 positioned between the clamping parts 255, and the support parts 251 of the clamping parts 255 compress the outer tube 220 and the inner tube 210.

Therefore, when a driver activates tilt or telescopic action so as to set the position of the steering column to be suitable for his or her body shape, the clamping parts 255 of the tilt bracket 250 coupled to the ring bolt 240 are tightened inwardly or released at the time of tightening or releasing the adjustment lever 115, so that the support parts 251 compress or release the outer periphery of the outer tube 200. Consequently, the tilt or telescopic action is executed.

In addition, in order to allow compression force to be more easily transmitted to the outer tube 220, flat mounting surfaces 221 may be formed on the opposite lateral sides of the outer periphery of the outer tube 220, which are engaged with the through-hole part 245 of the ring bolt 240 in such a manner that the flat mounting surfaces 221 come into face-to-face contact with the support parts 251 of the bracket 250, and the opposite lateral sides of the through-hole part 245 of the ring bolt 240 may be also formed in flat shapes to correspond to the mounting surfaces 221 of the outer tube 220.

Moreover, in order to allow the outer tube 220 to more easily contract, one or more axial grooves 223 may be formed on the outer periphery of the outer tube 220. In such a case, when the support parts 251 of the tilt bracket 250 apply compression force to the outer periphery of the outer tube 220 at the time of tightening the adjustment lever 115, the radial contraction of the outer tube 220 can be more easily induced since the grooves 223 firstly contract.

In order to increase the rigidity of the outer tube 220, it is possible to form one or more ribs 229 projecting from the outer periphery of the outer tube 220 and extending in the axial direction.

Since the tilt bracket 250 has an anchoring part 253 to be coupled to the mounting bracket 230 and a pair of opposite clamping parts 255 extending substantially vertically from the anchoring part 253, the tilt or telescopic action of the steering column 200 can be executed simultaneously when the steering column 200 is anchored to a vehicle body through the mounting bracket 230.

The anchoring part 253 is coupled to the mounting bracket 230 through fastening members, such as bolts, and the clamping parts 255 are engaged with the ring bolt 240. In such a case, coating areas 253a may be formed on the outer surfaces of the anchoring parts 253 which come into contact with the mounting bracket 230, wherein at the time of a vehicle collision, the coating areas 253a increase frictional force between the anchoring parts 253 and the mounting bracket 230 when the column collapses, thereby providing increased support force and hence improving impact energy absorption capability.

In addition, the clamping parts 255 are formed with seating recesses 257, respectively, and the through-hole part 245 of the ring bolt 240 is fitted in the seating recesses 257. Each of the seating recesses 257 is provided with a tilt slot 259. In addition, each of the seating recesses 257 is provided with a pair of support parts 251 at the opposite lateral sides thereof.

In order to increase the displacement of the clamping parts 255 toward the outer tube 220 at the time of tightening the adjustment lever, each of the clamping parts 255 of the tilt bracket is provided with a concave area 255a which is formed around the tilt slot 259 so as to reduce the thickness of each clamping part 255 in the concave area 255a, and a slit 255b which is formed by cutting the area surrounding the concave area 259a in a "U" shape.

Each concave area 255a is formed on the outer surface of the corresponding clamping part 255 in such a manner that the thickness of the area surrounding the tilt slot 259 can be reduced by a predetermined offset, and each of the slits 255b is formed by cutting the inner and outer surfaces of the corresponding clamping part 255 in the "U" shape.

The concave areas 255a and the slits 255b reduce the rigidity of the areas around the tilt slots of the clamping parts 255 when the clamping parts 255 are tightened toward the outer tube 220 at the time of tightening the adjustment lever 115. As a result, the displacement of the clamping parts 255 toward the outer tube can be increased and the support parts 251 and the outer tube 220 are allowed to come into face-to-face contact with each other while the clamping parts 255 are being tightened.

Each of the tilt slots 259 is opened at the tip end of the corresponding clamping part so that the fastening parts 243 of the ring bolt 240 can be fitted in the tilt slots 259, respectively, and each of the seating recesses 257 have support parts 251 on the opposite lateral sides thereof, wherein the support parts 251 are provided for supporting the outer periphery of the outer tube 220.

In addition, each of the tilt slots 259 is provided with ledges 259a at the open end thereof, wherein the ledges 259a protrude inwardly in each of the tilt slots 259 so as to prevent the ring bolt 240 from escaping from the tilt slots 259. Since the space between the ledges 259a in each tilt slot is larger than the diameter of the fastening parts 243 of the ring bolt 240, but smaller than the width of the tilt slot 259, it can be assured that the ring bolt 240 can be easily assembled and the escape of the fastening parts 243 of the ring bolt 240 can be prevented.

In addition, coating areas 251b or serration areas 251a may be formed on the support parts 251 of the tilt bracket 250 so as to increase support force or frictional force for the mounting surfaces 221 of the outer tube 220.

Therefore, at the time of tightening the adjustment lever 115, the frictional force between the support parts 251 and the mounting surfaces 221 is increased by the coating areas coated with a high friction material, thereby strongly retaining the anchoring position of the outer tube 220, or the serration areas 251a formed on the support parts 251 are compressed by the mounting surfaces 221 on the outer tube, thereby increasing the support force with the outer tube 220.

The seating recesses 257 of the tilt bracket 250 are adapted to receive the outer periphery of the through-hole part 245 of the ring bolt 240 with a clearance being formed between them. As a result, when the clamping parts 255 of the tilt bracket 250 inwardly contract at the time of tightening the adjustment lever 115, only the support parts 251 compress the outer periphery of the outer tube 220, and no interference occurs with the ring bolt 240.

Meanwhile, the outer tube 220 is provided with a telescopic action area 225 with a predetermined length at the end portion thereof engaged with the inner tube 210 so as to limit the distance for telescopic action. The telescopic action area 225 is an outer diameter-reduced area stepped in relation to the outer periphery of the outer tube 220, thereby forming catch steps 227 at the axial opposite ends of the telescopic action area 225, so that the extent of telescopic action is limited as the catch steps 227 are engaged with the support parts 251 of the tilt bracket 250.

That is, the telescopic action area 225 is formed by reducing the diameter of the outer periphery of the outer tube 220 at a position corresponding to the extent for telescopic action, and the ring bolt 240 is fitted on the outer periphery of the telescopic action area 225. As a result, if the outer tube 220 is slid toward the inner tube 210 at the time of telescopic action, the ring bolt 240 is caught by the catch steps 227 at the opposite ends of the telescopic action area 225, whereby the outer tube 220 cannot be slid any more.

According to the present invention configured as described above, since the support force for the outer tube at the time of tightening the adjustment lever can be increased and strengthened, and the tilt bolt is coupled on the central axis of the steering shaft, no bending is caused at the time of a vehicle collision, and the adjustment lever does not hit the driver on the knee, whereby collision safety can be improved, and the number of parts and steps of assembling them can be reduced.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units within the purpose of the present invention.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although some preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering column for a vehicle, comprising:
   a hollow inner tube surrounding a steering shaft;
   a hollow outer tube fitted on the outer periphery of the inner tube to be slid at the time of telescopic action;
   a ring bolt having a pair of fastening parts, to which an adjustment lever and an anchoring means are coupled, respectively, and an annular through-hole part formed between the fastening parts, the outer tube being introduced through the annular through-hole part; and
   a tilt bracket having an anchoring part coupled to a mounting bracket, and a pair of clamping parts extending substantially vertically from the anchoring part to be opposed to each other, wherein the clamping parts are formed with seating recesses, respectively, and the through-hole part of the ring bolt is fitted in the seating recesses, wherein each of the seating recesses is formed with a tilt slot, the fastening parts of the ring bolt extending through the tilt slots and coupled to the adjustment lever, and wherein support parts for supporting the outer periphery of the outer tube are formed at the opposite lateral sides of each of the seating recesses,
   wherein each of the clamping parts of the tilt bracket is formed with a concave part recessed from the outer surface to the inner surface of the clamping part so as to reduce the thickness of the clamping part, and having a slit formed by cutting the clamping part around the tilt slot.

2. The steering column as claimed in claim 1, wherein the outer tube is provided with one or more grooves extending in the longitudinal direction on the outer periphery thereof.

3. The steering column as claimed in claim 1, wherein a telescope bush is interposed between the inner tube and the outer tube.

4. The steering column as claimed in claim 1, wherein the outer tube is provided with a telescopic action area formed by reducing the outer diameter of the outer tube, thereby forming steps so as to limit the extent of telescopic action, and the extent of telescopic action is limited as the steps at the opposite axial ends of the telescopic action area are caught by the support parts of the tilt bracket.

5. The steering column as claimed in claim 1, wherein the seating recesses of the tilt bracket receive the through-hole part of the ring bolt with a clearance being formed in relation to the outer periphery.

6. The steering column as claimed in claim 1, wherein the outer tube is provided with one or more ribs which protrude from the outer periphery of the outer tube and extend in the axial direction of the outer tube.

7. The steering column as claimed in claim 1, wherein the outer tube is provided with flat mounting surfaces formed on the opposite lateral sides of the outer periphery of the outer tube engaged with the through-hole part of the ring bolt, the flat mounting surfaces coming into face-to-face contact with the support parts of the tilt bracket, and wherein the opposite lateral sides of the through-hole part of the ring bolt are also formed in flat shapes to correspond to the mounting surfaces of the outer tube, respectively.

8. The steering column as claimed in claim 1, wherein the support parts of the tilt bracket are formed with serration areas so as to increase support force with the outer tube.

9. The steering column as claimed in claim 1, wherein the support parts of the tilt bracket are formed with coating areas for increasing frictional force with the outer tube.

10. The steering column as claimed in claim 1, wherein each of the tilt slots has ledges at the open end thereof, which protrude from the inner walls of the tilt slot so as to prevent the ring bolt from escaping at the time of tilt action.

11. The steering column as claimed in claim 1, wherein the anchoring part of the tilt bracket is formed with a coating area on the outer surface, which comes into contact with the mounting bracket so as to increase frictional force with the mounting bracket at the time of a vehicle collision.

12. The steering column as claimed in claim 1, wherein the through-hole part of the ring bolt is slidably arranged in the seating recesses so as to be moveable relative to the seating recesses.

* * * * *